Patented June 28, 1927.

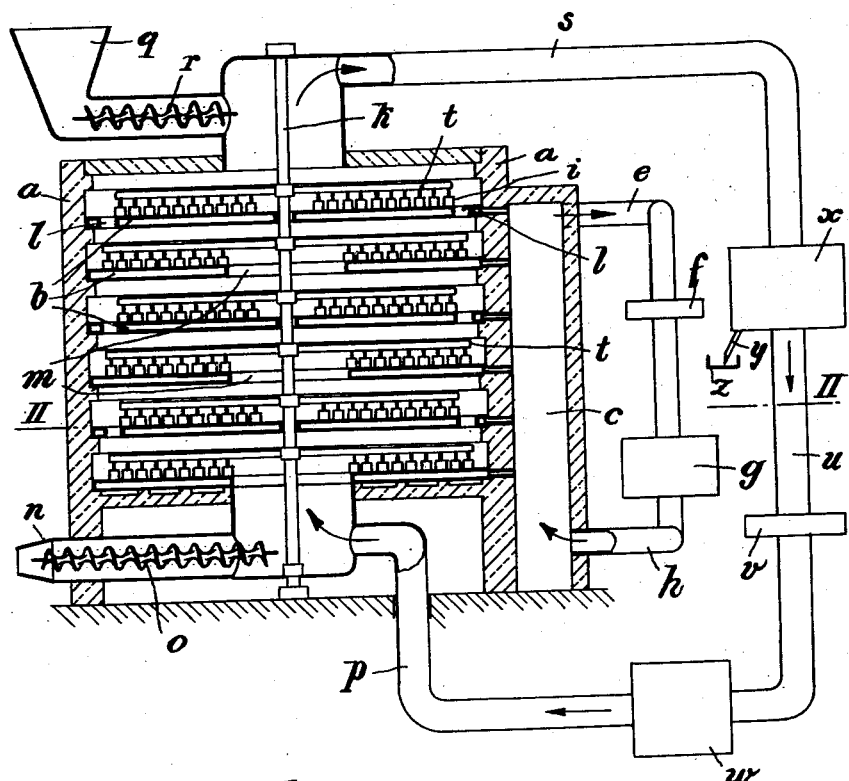
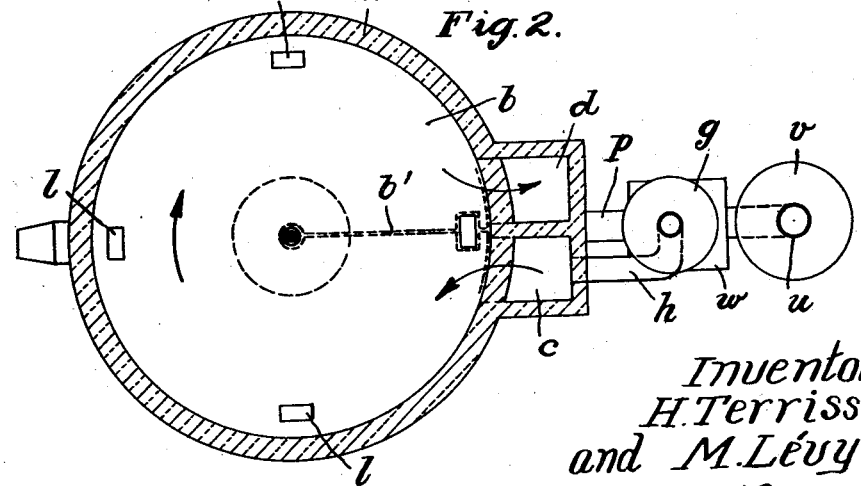

1,633,877

UNITED STATES PATENT OFFICE.

HENRI TERRISSE AND MARCEL LÉVY, OF GENEVA, SWITZERLAND.

PROCESS OF RECOVERING HYDROCHLORIC ACID.

Application filed March 15, 1921, Serial No. 452,414, and in Switzerland March 25, 1920.

This invention relates to the separation of liquid and volatile substances from solid material. In chemical industry it happens very often that it is necessary to separate, by heat, one or more liquids from one or more solid products. These liquid or solid products, or only one of them, may be liable to be destroyed or impaired by a high temperature.

In the drying of dextrine, for instance, the water of one product liable to become deteriorated by heat is separated by heating; or when saw-dust or wood chips are dried, the water is separated from a product which resists temperatures of 100° and over; finally in the manufacture of glucose or of dextrine from the cellulose contained in wood, by the process described in United States Patent No. 1,511,786, hydro-chloric acid solutions are separated from a mixture of dextrines, of glucose and of lignine.

It is known that air, preferably dried or heated, may be made use of to dry the most delicate products. By this method of drying, and especially when the operation is carried out at a comparatively low temperature, in order not to deteriorate the substance to be dried, the calorific yield becomes worse and worse, in proportion as the temperature at which drying is carried out becomes lower; so much so that if drying be carried out to recover the distilling product, the operation becomes more and more impracticable in proportion as the temperature of the air falls.

We have ascertained that it is possible to separate at a relatively low temperature a liquid from solid products while obtaining good calorific yields. When the products in question are capable of withstanding temperatures of 100° C. a calorific yield of about 80% may be attained and the liquid is capable of being recovered The present invention refers exactly to a process for the separation of liquids from solids, especially for separating and recovering hydrochloric acid solution from a powdery mixture of lignine, dextrine and glucose.

According to this process the solid products to be dried are indirectly heated, while travelling in thin layers in one direction, at a temperature which is not higher than the temperature which they can withstand without being deteriorated. During this indirect heating the products are also submitted to a current of gas previously heated to the temperature of drying, the gas circulating in opposite direction to that of the products and being in direct contact therewith. They are saturated with the vapors evolved from the products and draw them off from the vessel containing the material to be dried at a temperature comparatively little lower than the temperature they had at their entrance into the vessel.

By means of this process humid mixtures are dried in a continuous way at a relatively low temperature, a great amount of heat being economized without the use of vacuum. Further the removed volatile substances may be recovered.

By "indirect heating" is meant a heating in which the calories are furnished indirectly to the products to be heated, for instance through a wall which separates the products from the source of heat. This source may be for example, a gas or a liquid carrying the calories. In opposition thereto "direct heating" means a method where the heating gas or liquid is in direct contact with the product to be dried.

The indirect heating of the mass to be dried may take place by means of heating-bodies, such as hollow plates or walls, in which warm liquids or gases circulate. It may also be effected by warm gases which are intended to draw off the vapors of the liquid to be removed, these gases being first employed to heat, externally, the vessel containing the material to be dried, and then conducted into this vessel.

The indirect heating of the mass to be dried may take place by means of heating-bodies, such as hollow plates or walls, in which warm liquids or gases circulate. It may also be effected by warm gases which are intended to draw off the vapours of the liquid to be removed, these gases being first employed to heat, externally, the vessel containing the material to be dried, and then conducted into this vessel.

The gas employed may be air, inert gases such as nitrogen, water gas, carbonic acid and so on.

According to the temperature at which drying or distillation may take place without injury to the products to be dried, the gases may attain, when quitting the apparatus, temperatures of 90° C. and over. The liquid volatilized may then be easily recovered by cooling the gaseous current in order to condense the liquid. This gaseous current may, advantageously, be kept on closed circuit in such a way that the gas set free from the liquid returns into the dryer and is utilized afresh for removing the liquid from the product to be dried.

The apparatus for carrying out the operation includes a vessel intended to contain the product to be dried and combined on the one hand with a heating arrangement intended to indirectly heat the product at a temperature which is not higher than that which it can withstand without being deteriorated and on the other hand with means for causing the product to circulate and finally with means for making a current of previously heated gas pass over the product to be dried.

This apparatus may be constructed of material capable of resisting acids in the event of the products to be treated in it being acid.

The vessel in which the material to be dried is treated with hot gases may consist of a vertical cylinder enclosing a number of hollow plates superposed on each other within which circulates a hot body such as hot water vapor, or hot air, and on which the mass to be dried is extended in thin layers. Means are provided for making the hot gases pass over the plates in such a way as to evaporate the liquid and conduct it out of the cylinder. This cylinder as well as the plates and the other parts of the apparatus may consist of material which resists the action of acids, such as high silicious iron or pig iron. It may then with advantage be employed for the recovery of hydrochloric solutions mixed with lignine, dextrines and glucose, a mixture such as may be obtained in the saccharization of sawdust by the process described in the United States Patent No. 1,511,786 Serial No. 361,327.

The annexed drawing represents, by way of example, two constructional forms of an apparatus suitable for the practical carrying out of the process of the present invention.

Fig. 1 gives a diagrammatical view, partly in section and

Fig. 2 is a transverse section taken on the line 2—2 of Fig. 1.

The apparatus shown comprises a vertical cylinder $a$, in which hollow plates $b$ are arranged horizontally, one above the other. Each of these plates is provided with a partition $b'$ separating from each other the portions of the interior of the plates, which are in front of two channels $c$—$d$ (Fig. 2) with which the hollow space of each plate communicates. The channel $d$ is connected by a conduit $e$ with a ventilator $f$ and a heating apparatus $g$, which communicates by a conduit $h$ with the channel $c$. Above each plate $b$, an arm $t$, provided with scrapers $i$ is pivoted on a vertical shaft $k$ placed axially in the cylinder $a$. The upper plate $b$ is provided near its circumference with openings $l$ (Fig. 2), while the plate situated directly below has a central aperture $m$. The third is like the first, the fourth like the second and so on down the last plate which has an opening at its center. The latter is in communication, at one side, with a discharge pipe $n$ provided with a worm $o$ and at the other side with a pipe $p$ for the admission of the hot gases. Above the cylinder is a loading hopper $q$ provided with a worm $r$ and serving for the feeding into the cylinder of the material to be treated. The loading opening of the latter is also connected to a pipe $s$ for the exit of gas from the cylinder. This pipe is connected to a cooler $x$ from which proceeds a pipe $u$ in which is placed a ventilator $v$ and which conducts to a heating apparatus $w$. The latter is connected to the cylinder $a$ by the pipe $p$. $y$ is a pipe adapted to conduct the products of condensation from the cooler $x$ to a receptacle $z$.

The installation described may be used with advantage for the recovery of hydrochloric acid solutions mixed with lignine, dextrines or glucose, a mixture which is obtained in the saccharization of saw-dust by the process described in the United States Patent No. 1,511,786 (Serial No. 361,327). It is for that purpose constructed of material which resists acids.

The mode of operation of this installation is as follows:—

The moist and acid mixture of lignine, dextrine and glucose is introduced into the cylinder $a$ by the hopper $q$. The mixture first reaches the uppermost plate $b$, which like all the other plates, is heated to a temperature of about 50° C. by the warm air which arrives from the heating apparatus $g$ by way of the pipe $h$ and the channel $c$ and which circulates in the interior of the plate as shown by arrows, in order to quit it by the channel $d$, and return by $e$ to the ventilator $f$ and the heating apparatus $g$. The mixture is spread in thin layers on the plate by the scrapers $i$ of the arm $t$ which rotate along with the shaft $k$ which is put in motion by any suitable means. The scrapers of each of these arms are arranged relatively to the direction of rotation of the latter in such a manner that the material arriving on these plates is directed upon the odd plates towards apertures $l$ and on the even plates towards apertures $m$. They therefore fall by way of these openings from one plate to another and during their journey they meet a current of warm air entering the cylinder $a$ at $p$ and proceeding from the heating apparatus $w$, where it is heated to a temperature of 50° C., or a little over. As the temperature of the plates $b$ is regulated in such a way that the product which covers them is approximately 50° C., the air circulating in the cylinder borrows from these plates the thermal units necessary to enable them to quit the cylinder at a temperature practically little or lower than that which it had by entering the cylinder. It is then saturated with hydrochloric acid and with water and aspirated by the ventilator $v$ which draws it into the refrigerator $x$. There all the vapours drawn off by the air are condensed and the products of condensation are collected in any receptacle $z$. The cooled air, relieved of acid vapours, is forced into the heater $w$ where it is again reheated to a temperature of about 50° C., so as to be utilized anew in the cylinder $a$. It should be noticed that as glucose and dextrines are destroyed in the presence of hydro-chloric acid at 70° and higher, the distilling temperature of this acid ought to be about 50°. Should air present any inconvenience, then use may be made, in a closed circuit, of some inert gas such as for instance carbonic acid gas, nitrogen, or water gas.

The new process of drying and of distillation just described possesses, when compared with all other existing processes, the following material advantages:—

(1) The products may be dried at a low temperature while obtaining a calorific yield higher than in the ordinary processes, this being due to the fact that the heat is, for the most part, furnished indirectly and that the air which circulates in the inside, can have at its exit the most elevated temperature practicable.

(2) As the heating is indirect, it is possible, by cooling the air at the outlet of the dryer, to recover the volatile liquid, which would be extremely difficult if the heat were supplied by the air or gases, and if, consequently, the quantities of air became very large and more especially when the product is liable to be deteriorated at high temperatures.

(3) By operating in a closed circuit, the distilling product is recovered in a much more efficient manner. Actually the manner of proceeding is a distillation in which the evaporation takes place at a low temperature, this being due to the circulation of the air which avoids the necessity of working at a reduced pressure, as is the common practice at present. The new process simplifies the apparatus which when a vacuum is employed is very complicated and further it facilitates, without difficulty, continuous working.

What we claim and desire to secure by Letters Patent of the United States is:—

A process for separating and recovering hydrochloric acid solution from a powdery mixture of lignine, dextrine and glucose, comprising indirectly heating the mixture by conveying the same in thin layers in one direction and in direct contact with a gaseous current which has been previously heated sufficiently to remove the hydrochloric acid in a vaporized state from the solid material without deteriorating the same and to dry the remaining solid material, then condensing and separating the vaporized hydrochloric acid from the gaseous current, and reheating the gaseous current and again using it as before for removing the hydrochloric acid of the powdery mixture.

In testimony whereof we have affixed our signatures.

HENRI TERRISSE.
MARCEL LÉVY.